(12) United States Patent
Tang et al.

(10) Patent No.: US 10,931,185 B2
(45) Date of Patent: Feb. 23, 2021

(54) LINEAR VIBRATION MOTOR

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC Acoustic Technologies (Shenzhen) Co., Ltd., Shenzhen (CN)

(*) Notice: Subject to any disclaimer, the term of this patent is extended or adjusted under 35 U.S.C. 154(b) by 70 days.

(21) Appl. No.: 16/527,062

(22) Filed: Jul. 31, 2019

(65) Prior Publication Data
US 2020/0044538 A1 Feb. 6, 2020

(30) Foreign Application Priority Data
Aug. 3, 2018 (CN) .......................... 201821255458.1

(51) Int. Cl.
*H02K 33/12* (2006.01)
*H02K 33/18* (2006.01)
*B06B 1/04* (2006.01)

(52) U.S. Cl.
CPC ............. *H02K 33/12* (2013.01); *H02K 33/18* (2013.01); *B06B 1/045* (2013.01)

(58) Field of Classification Search
CPC ........ H02K 33/00; H02K 33/12; H02K 33/14; H02K 33/18; H02K 35/02; B06B 1/04; B06B 1/045; B06B 2201/53
See application file for complete search history.

(56) References Cited

U.S. PATENT DOCUMENTS

| | | | | |
|---|---|---|---|---|
| 8,097,988 B2 * | 1/2012 | Kim | ................. | H02K 33/16 310/15 |
| 9,553,497 B2 * | 1/2017 | Kim | ................. | H02K 33/02 |
| 9,815,085 B2 * | 11/2017 | Chun | .................. | B06B 1/045 |
| 10,158,277 B2 * | 12/2018 | Chun | .................. | H02K 33/02 |
| 2011/0266892 A1 * | 11/2011 | Wauke | ................ | B06B 1/045 310/25 |
| 2018/0241293 A1 * | 8/2018 | Miyazaki | ............. | B06B 1/045 |
| 2020/0212776 A1 * | 7/2020 | Ling | ................. | H02K 33/16 |

FOREIGN PATENT DOCUMENTS

KR  101224432  *  1/2013 ............. H02K 7/065

* cited by examiner

*Primary Examiner* — Burton S Mullins
(74) *Attorney, Agent, or Firm* — W&G Law Group LLP

(57) ABSTRACT

The present disclosure provides a linear vibration motor, including a housing, a vibration unit, an elastic component, and a driving unit. the driving unit includes a first coil component and a second coil component that are disposed opposite to each other and spaced apart from each other, the vibration unit includes a first permanent magnet, two second permanent magnets, and two third permanent magnets, the first permanent magnet is disposed between the first coil component and the second coil component, the two second permanent magnets are disposed opposite to two ends of the first coil component, and the two third permanent magnets are disposed opposite to two ends of the second coil component. Compared with the related art, the vibration unit of the linear vibration motor provided in the present disclosure provides a greater driving force and a higher response speed during vibration.

10 Claims, 7 Drawing Sheets

LINEAR VIBRATION MOTOR

TECHNICAL FIELD

The present disclosure relates to the field of vibration motors, and in particular, to a linear vibration motor.

BACKGROUND

A linear vibration motor is a component that converts electric energy to mechanical energy based on a generation principle of an electromagnetic force. The linear vibration motor is generally mounted in a portable mobile device, to generate vibration feedback, for example, vibration of a mobile phone or a vibration feedback of a game console.

In the prior art, the linear vibration motor includes a housing having an accommodation space, a vibration unit accommodated in the accommodation space, an elastic member suspending the vibration unit in the accommodation space, and a driving unit driving the vibration unit to vibrate. The vibration unit includes a permanent magnet, the driving unit includes a coil, and the linear vibration motor generally provides a driving force by using only a Lorentz force generated through interaction between the coil and a magnetic field of the permanent magnet, to drive the vibration component to vibrate reciprocally. However, the driving force of the linear vibration motor is relatively small, causing a relatively long response time in vibration.

Therefore, it is necessary to provide a new linear vibration motor to resolve the foregoing problem.

BRIEF DESCRIPTION OF THE DRAWINGS

To more clearly describe the technical solutions in the embodiments of the present disclosure, the following briefly describes the accompanying drawings required for describing the embodiments. Apparently, the accompanying drawings in the following description merely show some embodiments of the present disclosure, and a person of ordinary skill in the art can derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

Embodiment 1

Figure 1:
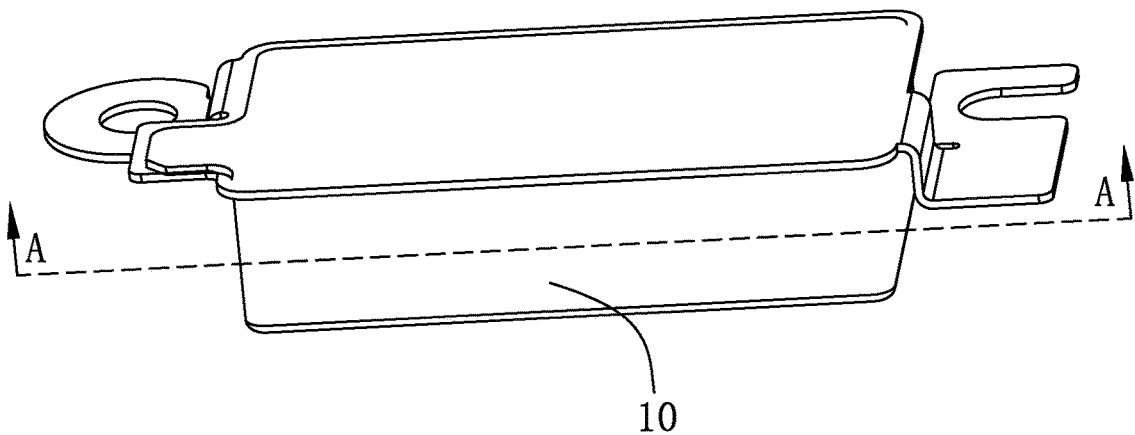
FIG. 1 is a three-dimensional schematic structural diagram of Embodiment 1 of a linear vibration motor according to the present disclosure.
Figure 2:
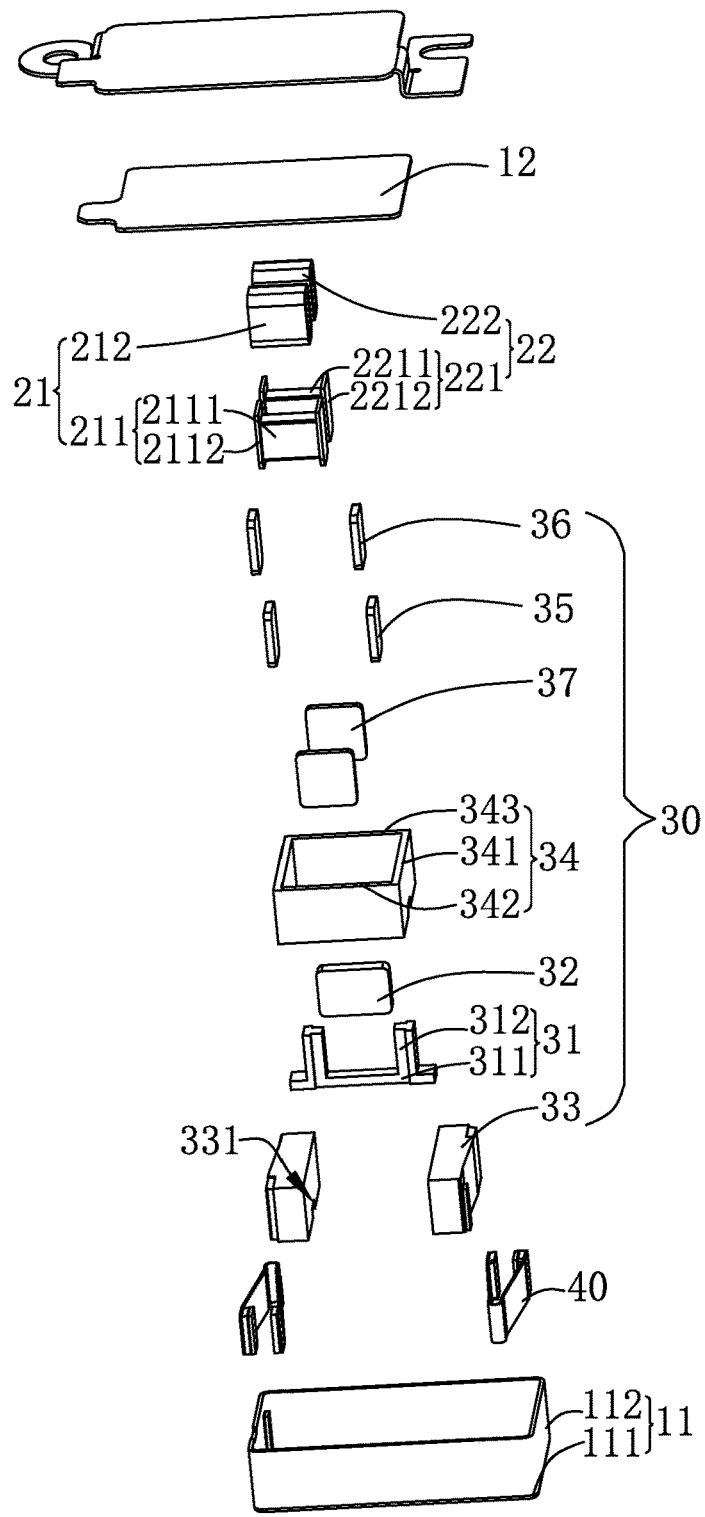
FIG. 2 is an exploded schematic structural diagram of Embodiment 1 of a linear vibration motor according to the present disclosure.
Figure 3:
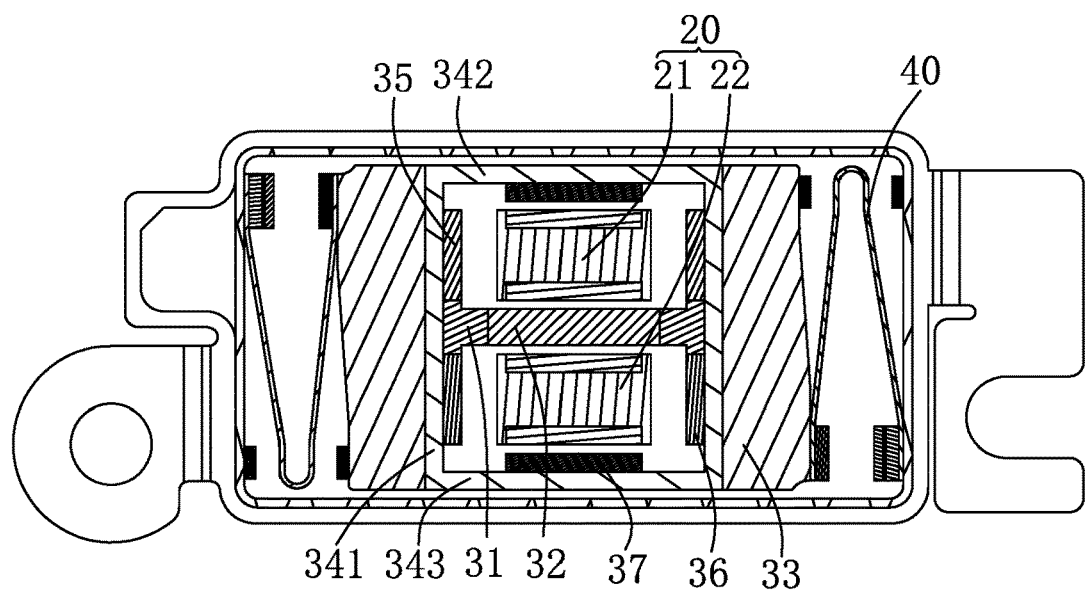
FIG. 3 is a schematic diagram of a section taken along a line A-A in FIG. 1.

Referring to FIG. 1 to FIG. 3, the present disclosure provides a linear vibration motor 100, including a housing 10 having an accommodation space, a driving unit 20 and a vibration unit 30 that are accommodated in the accommodation space, and an elastic component 40 suspending the vibration unit 30 in the accommodation space. The driving unit 20 is used to drive the vibration unit 30 to vibrate.

The housing 10 includes a first housing 11 and a second housing 12 covering the first housing 11 to define the accommodation space.

The first housing 11 includes a bottom wall 111 disposed opposite the second housing 12 and a side wall 112 extending from the bottom wall 111 in a bending manner.

The driving unit 20 includes a first coil component 21 and a second coil component 22 that are fixed on the housing 10 and that are disposed opposite to each other and spaced from each other.

The first coil component 21 includes a first iron core 211 and a first coil 212 wound around the first iron core 211.

The first iron core 211 includes a first body portion 2111, and two first extension portions 2112 extending from two ends of the first body portion 2111 toward a direction away from an axis of the first body portion 2111.

The first coil 212 is wound around the first body portion 2111. After a current is applied to the first coil 212, the first iron core 211 is magnetized, and the two first extension portions 2112 have opposite magnetic polarities.

The second coil component 22 includes a second iron core 221 and a second coil 222 wound around the second iron core 221.

The second iron core 221 includes a second body portion 2211, and two second extension portions 2212 extending from two ends of the second body portion 2211 toward a direction away from an axis of the second body portion 2211.

The second coil 222 is wound around the second body portion 2211. After a current is applied to the second coil 222, the second iron core 221 is magnetized, and the two second extension portions 2212 have opposite magnetic polarities.

Specifically, a direction of a current applied to the first coil component 21 is opposite to a direction of a current applied to the second coil component 22. That is, after currents are applied to the two first extension portions 2112 and the two second extension portions 2212, the first extension portion 2112 and the second extension portion 2212 located at a same side have different magnetic polarities. For example, when the first extension portion 2112 at one side is N pole, the second extension portion 2212 at the same side is S pole.

A signal input source of the first coil component 21 and a signal input source of the second coil component 22 may be same signal sources or two separate signal sources. When the signal input source of the first coil component 21 and the signal input source of the second coil component 22 are a same signal source, and the first coil component and the second coil component may be connected in series or connected in parallel.

The vibration unit 30 includes a first mass block 31 disposed between the first coil component 21 and the second coil component 22, a first permanent magnet 32 embedded in the first mass block 31, two second mass block 33 spaced from each other, a yoke 34 fixed on the two second mass blocks 33, and a second permanent magnet 35, a third permanent magnet 36, and a fourth permanent magnet 37 embedded in the yoke 34.

The first mass block 31 and the second mass block 33 are made of a non-magnetic conductive material.

The first mass block 31 includes a body portion 311 close to the bottom wall 111, and two extension portions 312 extending from the body portion 311 toward a direction away from the bottom wall 111.

The two extension portions 312 are spaced from each other. Preferably, the two extension portions 312 are disposed opposite each other and spaced from each other with respect to the center of the body portion 311.

The first permanent magnet 32 abuts against the body portion 311 and the two extension portions 312.

A magnetic polarity of one side of the first permanent magnet 21 close to the first coil component 32 is opposite to a magnetic polarity of one side of the first permanent magnet 32 close to the second coil component 22.

It can be understood that, since a direction of a current applied to the first coil component 21 is opposite to a direction of a current applied to the second coil component 22, a resultant force of a Lorentz force generated through interaction between the first coil component 21 and a magnetic field of the first permanent magnet 32 and a Lorentz force generated through interaction between the second coil component 22 and a magnetic field of the first permanent magnet 32 points to a sme direction. In this case, a driving force driving the vibration unit 30 to vibrate is improved.

The first mass block 31, the first permanent magnet 32, the yoke 34, the second permanent magnet 35, the third permanent magnet 36, the fourth permanent magnet 37, the first coil component 21, and the second coil component 22 are disposed between the two second mass blocks 33. That is, the two second mass blocks 33 together define the space accommodating the foregoing components.

The second mass block 33 includes an avoiding portion 331 recessed from one side close to the body portion 311 toward one side away from the body portion 311. The body portion 311 is correspondingly inserted in the avoiding portion 331 to abut against and fix the second mass block 33.

The yoke 34 has a rectangular frame-shaped structure, and the yoke 34 includes two first sides 341 disposed opposite to each other and a second side 342 and a third side 343 that connect two ends of the two first sides 341 respectively.

The two second mass block 33 abut against the two first sides 341 respectively, and the first mass block 31, the first permanent magnet 32, the second permanent magnet 35, the third permanent magnet 36, the fourth permanent magnet 37, the first coil component 21, and the second coil component 22 are all accommodated in the space defined by the yoke 34.

Two second permanent magnets 35 are provided, and the two second permanent magnets 35 are disposed on the two first sides 341 respectively.

The two second permanent magnets 35 are disposed opposite the two first extension portions 2112 respectively, and the two second permanent magnets 35 have a same magnetic polarity at one side close to the respective first extension portion 2112.

Two third permanent magnets 36 are provided, and the two third permanent magnets 36 are disposed on the two first sides 341 respectively, and spaced from the second permanent magnet 35.

The two third permanent magnets 36 are disposed opposite the two second extension portions 2212, and the two third permanent magnets 36 have a same magnetic polarity at one side close to the respective second extension portion 2212 are the same.

Specifically, a magnetic polarity of one side of the second permanent magnet 35 close to the first extension portion 2112 is opposite to a magnetic polarity of one side of the third permanent magnet 36 close to the second extension portion 2212. For example, when one side of each of the two second permanent magnets 35 close to each of the two first extension portions 2112 is N pole, one side of each of the two third permanent magnets 36 close to each of the two second extension portions 2212 is S pole.

When a current is applied to the first coil component 21 and the second coil component 22, the first iron core 211 and the second iron core 221 are magnetized, the two second permanent magnets 35 generate attraction and repulsion to the two first extension portions 2112 to generate a driving force, and the two third permanent magnets 36 generate attraction and repulsion to the two second extension portions 2212 to generate a driving force. Since the second permanent magnet 35 and the third permanent magnet 36 have opposite magnetism, and reverse currents are applied to the first coil component 21 and the second coil component 22, a resultant force of a driving force caused by the second permanent magnet 35 to the first extension portion 2112 and a driving force caused by the third permanent magnet 36 to the second extension portion 2212 points to a same direction. In this case, a driving force driving the vibration unit 30 to vibrate is improved.

Two fourth permanent magnets 37 are provided, and the two fourth permanent magnets 37 are respectively fixed on the second side 342 and the third side 343, and respectively disposed opposite the first coil component 21 and the second coil component 22. A magnetic polarity of one side, of the fourth permanent magnet 37 located on the second side 342, close to the first coil component 21 is opposite to a magnetic polarity of one side of, the fourth permanent magnet 37 located on the third side 343, close to the second coil component 22. For example, when one side, of the fourth permanent magnet 37 located on the second side 342, close to the first coil component 21 is N pole, one side of, the fourth permanent magnet 37 located on the third side 343, close to the second coil component 22 is S pole.

When a current is applied to the first coil component 21 and the second coil component 22, the first coil component 21 interacts with a magnetic field of the fourth permanent magnet 37 located on the second side 342 to generate a Lorentz force, and the second coil component 22 interacts with a magnetic field of the fourth permanent magnet 37 located on the third side 343 to generate a Lorentz force. Since the first coil component 21 and the second coil component 22 have opposite current directions, and magnetic polarities of the two fourth permanent magnets 37 close to the first coil component 21 and the second coil component 22 are opposite, a resultant force of Lorentz forces generated by the first coil component 21 and the second coil component 22 with the fourth permanent magnet 37 point to a same direction. In this case, a driving force driving the vibration unit 30 to vibrate is improved.

Two elastic components 40 are provided, and the two elastic components 40 connect the two second mass blocks 33 and the side wall 112 respectively and suspend the vibration unit 30 in the housing 10.

Figure 4:
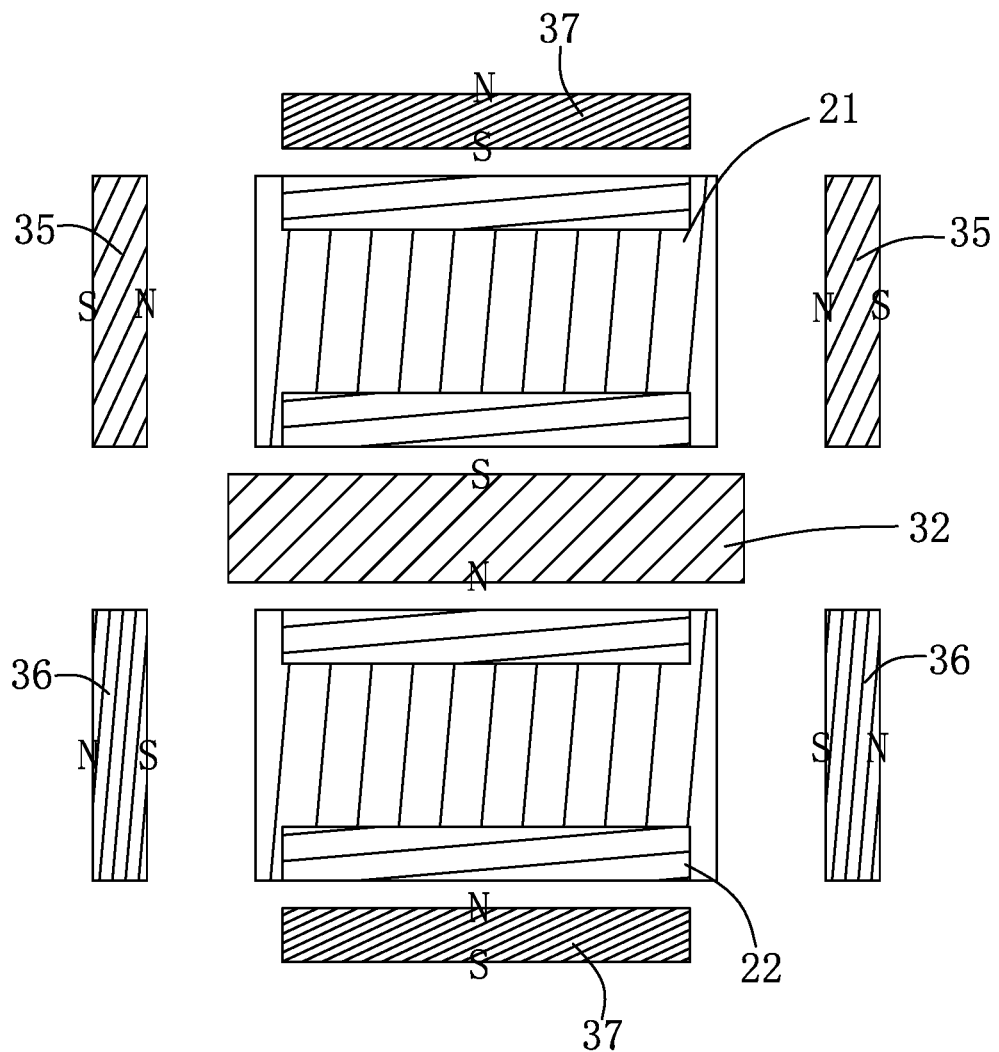
FIG. 4 is a schematic structural diagram of magnetic polarities of an iron core and a permanent magnet after a linear vibration motor is electrified according to the present disclosure.

Referring to FIG. 4, in this embodiment, one side of the first permanent magnet 32 close to the first coil component 21 is S pole, one side of the first permanent magnet 32 close to the second coil component 22 is N pole, one side of the second permanent magnet 35 close to the first extension portion 2112 is N pole, one side of the third permanent magnet 36 close to the second extension portion 2212 is S pole; one side, of the fourth permanent magnet 37 located on the second side 342, close to the first coil component 21 is S pole, and one side, of the fourth permanent magnet 37 located on the third side 343, close to the second coil component 22 is N pole.

When the first coil component 21 and the second coil component 22 are electrified, the first coil component 21 interacts with the first permanent magnet 32 and the fourth permanent magnet 37 respectively to generate a Lorentz force, the second coil component 22 interacts with the first permanent magnet 32 and the fourth permanent magnet 37 respectively to generate a Lorentz force, and in addition, the first extension portion 2112 is magnetized and generates an acting force with the second permanent magnet 35, and the second extension portion 2212 is magnetized and generates an acting force with the third permanent magnet 36. A resultant force of the foregoing plurality of forces points to a same direction, to push the vibration unit 30 to vibrate.

Correspondingly, when the first coil component 21 and the second coil component 22 are reversely electrified, a resultant force of the plurality of acting forces points to an opposite side, to push the vibration unit 30 to vibrate in an opposite direction. Certainly, magnetic polarities of the first permanent magnet 32, the second permanent magnet 35, the third permanent magnet 36, and the fourth permanent magnet 37 may be opposite to the settings made above, and a principle of forming a magnetic loop is the same as that of generating an acting force between the first extension portion 2112 and the second extension portion 2212 described above.

The plurality of Lorentz forces and the plurality of acting forces described above are superposed, to achieve a greater driving force and a higher response speed of the linear vibration motor 100.

Embodiment 2

Figure 5:
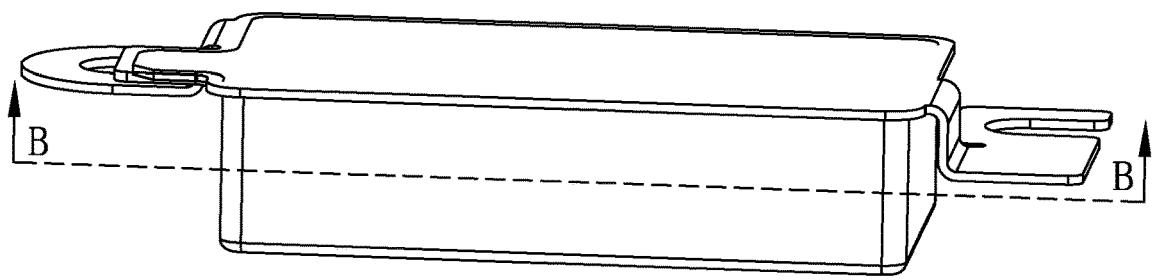
FIG. 5 is a three-dimensional schematic structural diagram of Embodiment 2 of a linear vibration motor according to the present disclosure.
Figure 6:
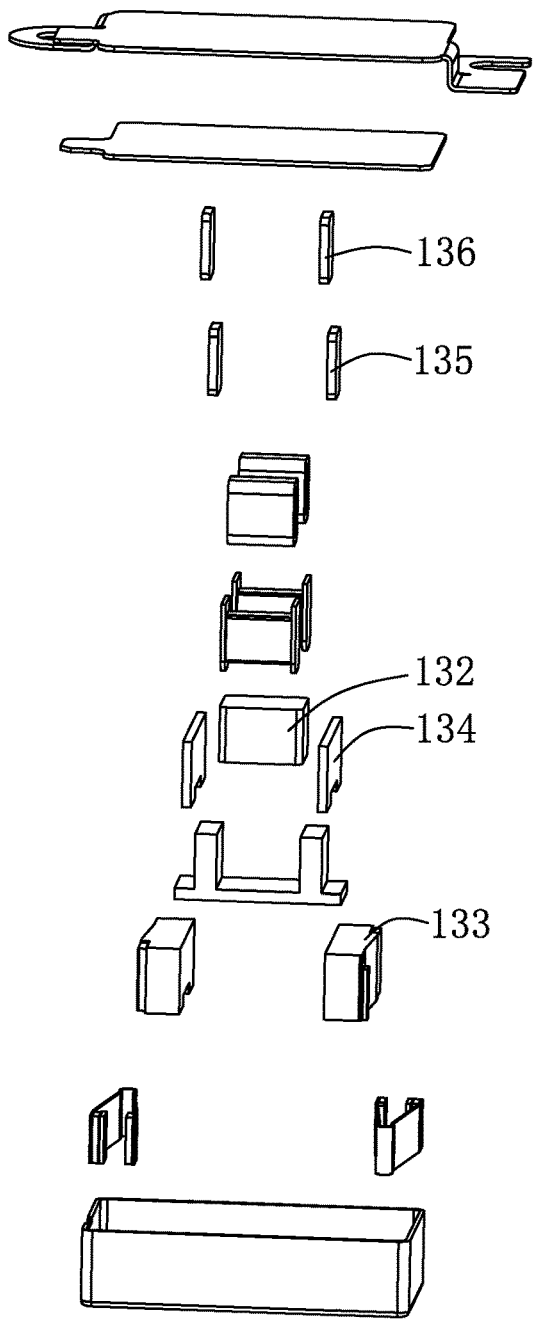
FIG. 6 is an exploded schematic structural diagram of Embodiment 2 a linear vibration motor according to the present disclosure.
Figure 7:
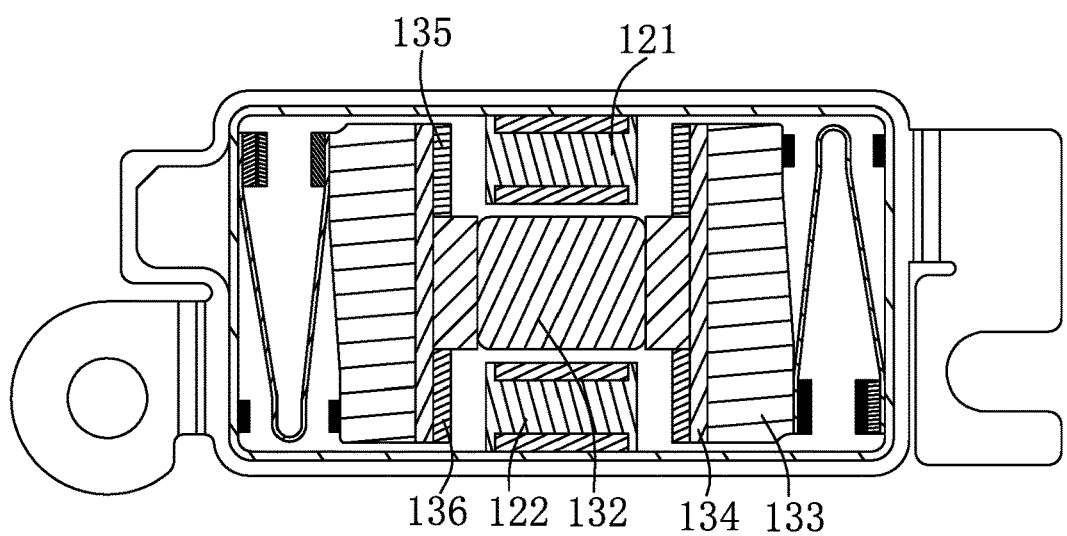
FIG. 7 is a schematic diagram of a section taken along a line B-B in FIG. 4.

This embodiment is basically the same as Embodiment 1, and a difference lies in that:

Referring to FIG. 5 to FIG. 7, in the linear vibration motor 200 provided in this embodiment, two yokes 134 are provided, and the two yokes 134 are elongated and are fixedly connected to the two second mass blocks 133 respectively. In addition, in this embodiment, the fourth permanent magnet in Embodiment 1 is no longer provided, that is, in this embodiment, the first permanent magnet 132, the second permanent magnet 135, and the third permanent magnet 136 generate a driving force with the first coil component 121 and the second coil component 122 to drive the vibration unit to vibrate.

Compared with the related art, in the linear vibration motor provided in the present disclosure, the first coil component and the second coil component are disposed to form a dual-coil structure. After a current is applied, the first coil component and the second coil component interact with a magnetic field of the first permanent magnet to generate a Lorentz force. In addition, two ends of the first coil component are magnetized to have different magnetic polarities and generate an acting force with the two second permanent magnets, two ends of the second coil component are magnetized to have different magnetic polarities and generate an acting force with the two third permanent magnets, the Lorentz force generated between the first coil component and the second coil component and the first permanent magnet, the acting force generated between the first coil component and the second permanent magnet, and the acting force generated between the second coil component and the third permanent magnet are superposed, so that a driving force driving the vibration unit to vibrate is improved, thereby providing a higher response speed of the linear vibration motor.

Only some embodiments of the present disclosure are described above, and it should be noted herein that, for a person of ordinary skill in the art, improvements can also be made without departing from the creative concept of the present disclosure, and these improvements shall fall within the protection scope of the present disclosure.

What is claimed is:

1. A linear vibration motor, comprising a housing having an accommodation space, a vibration unit accommodated in the accommodation space, an elastic member suspending the vibration unit in the accommodation space, and a driving unit driving the vibration unit to vibrate and fixed in the housing;
    wherein the driving unit comprises a first coil component and a second coil component that are disposed opposite each other and spaced from each other; the vibration unit comprises a first permanent magnet, two second permanent magnets, and two third permanent magnets; the first permanent magnet is disposed between the first coil component and the second coil component; the two second permanent magnets are disposed opposite two ends of the first coil component respectively; the two third permanent magnets are disposed opposite two ends of the second coil component respectively; and
    wherein a magnetic polarity of one side of the first permanent magnet close to the first coil component is opposite to a magnetic polarity of one side of the first permanent magnet close to the second coil component; same magnetic poles of the two second permanent magnets are disposed opposite each other, same magnetic poles of the two third permanent magnets are disposed opposite each other; and a magnetic polarity of the oppositely disposed poles of the second permanent magnets is opposite to a magnetic polarity of the oppositely disposed poles of the third permanent magnet; and
    a direction of a current applied to the first coil component is opposite to a direction of a current applied to the second coil component.

2. The linear vibration motor according to claim 1, wherein the vibration unit further comprises two second mass blocks disposed opposite each other and spaced from each other, a first mass block fixed between the two second mass blocks, and a yoke fixed on the two second mass blocks; the first permanent magnet is embedded in the second mass block, and both the second permanent magnet and the third permanent magnet are embedded in the yoke.

3. The linear vibration motor according to claim 2, wherein the yoke has a rectangular frame-shaped structure, the yoke comprises two first sides disposed opposite each other and a second side and a third side that connect the two first sides; the two first sides abut against the two second mass blocks respectively, and the second permanent magnets and the third permanent magnets are fixed on the first sides.

4. The linear vibration motor according to claim 3, wherein the vibration unit further comprises two fourth permanent magnets, the two fourth permanent magnets are respectively fixed on the second side and the third side and respectively disposed opposite the first coil component and the second coil component; a magnetic polarity of one side, of the fourth permanent magnet located on the second side, close to the first coil component is opposite to a magnetic polarity of one side of, the fourth permanent magnet located on the third side, close to the second coil component.

5. The linear vibration motor according to claim 2, wherein two yokes are provided, the two yokes are elongated, and the two yokes are fixed on the two second mass blocks respectively.

6. The linear vibration motor according to claim 2, wherein the housing comprises a first housing and a second housing covering the first housing; the first housing comprises a bottom wall disposed opposite the second housing and a side wall extending from the bottom wall in a bending manner; the first mass block comprises a body portion close to the bottom wall, and two extension portions extending from the body portion in a direction away from the bottom wall, the two extension portions are spaced from each other, and the first permanent magnet abuts against the body portion and the two extension portions.

7. The linear vibration motor according to claim 2, wherein two elastic components are provided, and the two elastic components are connected to the two second mass blocks respectively.

8. The linear vibration motor according to claim 1, wherein the first coil component comprises a first iron core and a first coil wound around the first iron core, the second coil component comprises a second iron core and a second coil wound around the second iron core;

the first iron core comprises a first body portion, and two first extension portions extending from two ends of the first body portion in a direction away from an axis of the first body portion; the first coil is wound around the first body portion, the two second permanent magnets are disposed opposite the two first extension portions respectively, and the two first extension portions have opposite magnetic polarities after a current is applied to the first coil; and the second iron core comprises a second body portion, and two second extension portions extending from two ends of the second body portion in a direction away from an axis of the second body portion; the second coil is wound around the second body portion, the two third permanent magnets are disposed opposite the two second extension portions respectively, and the two second extension portions have opposite magnetic polarities after a current is applied to the second coil.

9. The linear vibration motor according to claim 1, wherein a signal input source of the first coil component and a signal input source of the second coil component are a same signal source, and the first coil component and the second coil component are connected in series or connected in parallel.

10. The linear vibration motor according to claim 1, wherein a signal input source of the first coil component and a signal input source of the second coil component are two separate signal sources.

* * * * *